UNITED STATES PATENT OFFICE.

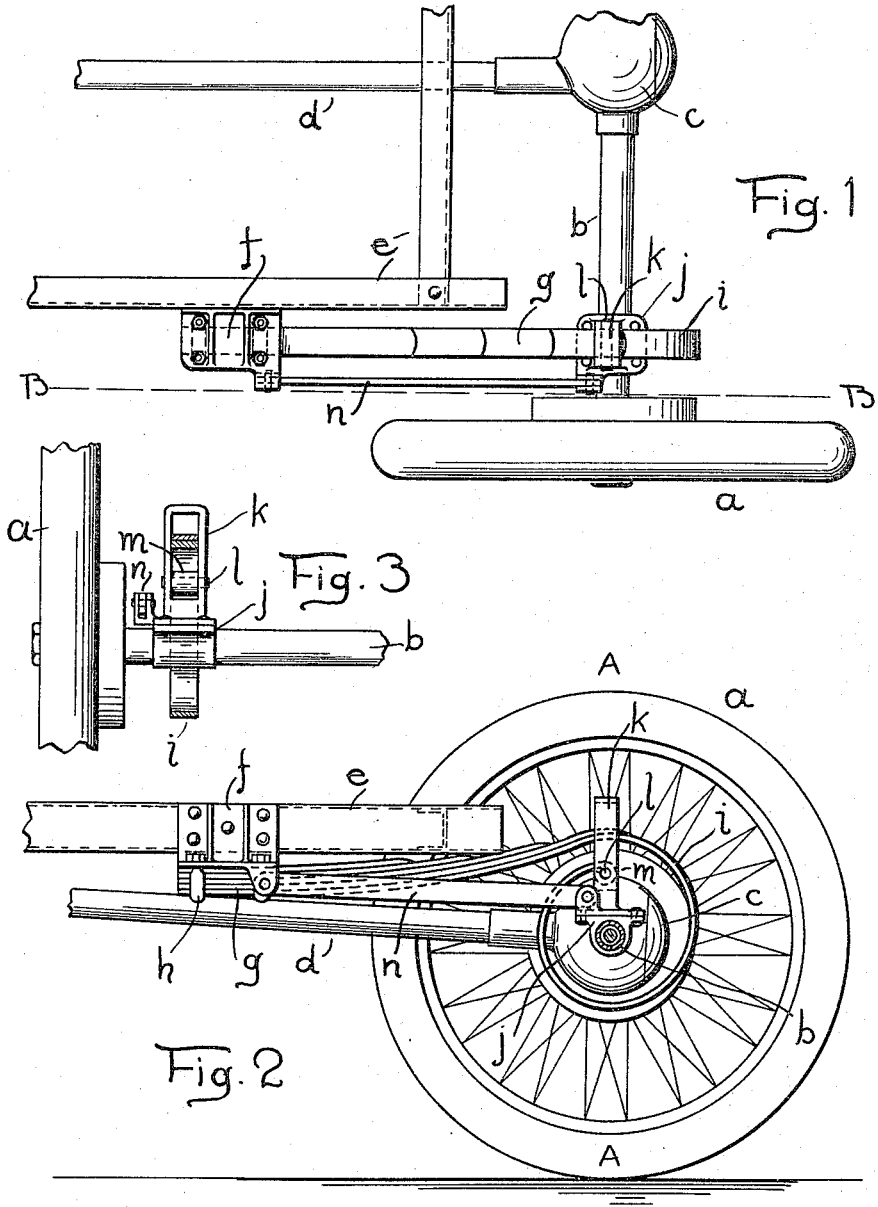

WILLIAM A. PUNGS, OF DETROIT, MICHIGAN.

SPRING SUSPENSION.

1,148,926.  Specification of Letters Patent.  Patented Aug. 3, 1915.

Application filed January 21, 1915. Serial No. 3,438.

*To all whom it may concern:*

Be it known that I, WILLIAM A. PUNGS, a citizen of the United States, residing at Detroit, county of Wayne, State of Michigan, have invented a certain new and useful Improvement in Spring Suspension, and declare the following to be a full, clear, and exact description of the same, such as will enable others skilled in the art to which it pertains to make and use the same, reference being had to the accompanying drawings, which form a part of this specification.

This invention relates to spring suspension in vehicles and has for its object a simple form of spring suspension in which provision is made for limiting the movement of the more flexible part of the spring.

Figure 1 is a fragmentary plan view of an automobile chassis, showing my new spring suspension. Fig. 2 is a side elevation of the wheel, part of the body and my spring suspension, the elevation being taken from the inside of the wheel. Fig. 3 is a section on the line A A of Fig. 2.

The vehicle wheel is designated *a*, the rear axle casing *b*, the differential casing *c*, the propeller shaft casing *d* and the body frame *e*. The customary spring retaining bracket *f* is bolted to the side of the body frame *e*. To this is bolted, by suitable clips *h*, the leaf spring *g*. This leaf spring is of the cantaliver type of spring suspension but differs therefrom in having the lowest leaf considerably longer than the others and bent around the axle casing in a spiral to form what is ordinarily known as a C-spring. This C-spring is indicated by the character *i*.

*j* designates a shelf located upon the rear axle casing *b*. Upon this is supported an upright member or a yoke *k* in the form of an inverted U. This yoke performs a useful work in connection with the limiting of the initial spring action and the rebound of the C portion of the spring. The pin *l* near the lower end of the yoke pivots the end of the C-spring *i*, which is curled around it at *m*. When the portion *m* strikes against the upper portion of the C it tends to retard further contraction of the C portion and further stress is communicated to the plural leaf portion of the spring. The rebound of the C portion is yieldingly resisted by the top of the C coming in contact with the top or stop portion of the yoke.

*n* is a radius rod for communicating the driving thrust from the rear wheels to the vehicle body and for resisting the torque of the propeller shaft.

From the above description it will be seen that I have devised a spring suspension in which there is a relatively great amplitude for easy spring action but yet furnishes limiting agencies to yieldingly resist the too great movement of the easy flexing portion of the spring. The easy flexure referred to is made possible by the use of the large C-spring. All the stresses of the relative movement of the body and the wheels is not borne by the C-spring alone but also by the plural leaf structure, that is to say, when the C-spring, which is the portion of the spring of the easiest flexure, reaches its limit by contacting with either the pin or the top of the yoke, then a great deal of the stress is transmitted to the plural leaf portion of the spring where it is resisted by a stiffer action better calculated to resist the severe stress.

The large C-spring forms a very convenient means to absorb the small shocks caused by small inequalities in the road. These are shocks that are very often not taken up by a stiff pair of springs for the reason that such springs are not flexible enough to be affected thereby, and for this reason so-called shock absorbers are very often employed to give the spring a sensibility to small shocks. In my form of spring suspension the necessity of these shock absorbers is entirely done away with, as is also the necessity of rebound dampners or rebound straps.

What I claim is:

1. In combination with a vehicle provided with a body, wheels therefor, and means for journaling the wheels, of a spring suspension, comprising a spring fastened to the body, having at one end a C-spring curving in a large spiral below the center of the wheel, and an upright member fastened to the means for journaling the wheels and having a pin for securing the end of the C-spring and also a stop engaging over the spring for limiting the spring movement of the C-spring end.

2. In combination with a vehicle provided with a body, wheels therefor, and means for journaling the wheels, of a spring suspension, comprising a spring fastened to the body and having at one end a C-spring portion curving below the center of the wheel and thence above the center of the wheel, and a yoke carried upon the means for journaling the wheels, the said yoke serving to fasten the end of the C-portion and also serving to straddle above the end of the C-portion the top of the C-portion.

3. In combination with a vehicle provided with a body, wheels therefor, and means for journaling the wheels, of a spring fastened to the body and having at its outer end a large C-portion curving about the means for journaling the wheels to a position above the same, a yoke supported upon the means for journaling the wheels, and a pin near the lower portion of the yoke for securing the end of the C-portion of the spring, the said spring passing through the yoke above the said pin.

4. In combination with a vehicle provided with a body, wheels therefor, and means for journaling the wheels, of a spring suspension, comprising a leaf spring fastened to the body, having a stiff portion and a flexible portion, and an upright member having a stop portion engaging over the spring and secured to the means for journaling the wheels for constraining the movement of the flexible portion in either direction relatively to the more rigid portion.

5. In combination with a vehicle provided with a body, wheels for supporting the same, and means for journaling the wheels, of a spring suspension, comprising a leaf spring fastened to the body and provided with a flexible portion and a rigid portion, and a yoke engaging about the flexible portion for the purpose of limiting the movement of the relative portion relatively to the rigid portion.

In testimony whereof, I sign this specification in the presence of two witnesses.

WILLIAM A. PUNGS.

Witnesses:
STUART C. BARNES,
VIRGINIA C. SPRATT.

Copies of this patent may be obtained for five cents each, by addressing the "Commissioner of Patents, Washington, D. C."